United States Patent Office 3,354,158
Patented Nov. 21, 1967

3,354,158
PROCESS IMPROVEMENTS FOR PREPARING
CYANURIC ACID
Eugene C. Sobocinski, St. Louis, and William F. Symes,
Webster Groves, Mo., assignors to Monsanto Company,
St. Louis, Mo., a corporation of Delaware
No Drawing. Filed Dec. 23, 1964, Ser. No. 420,764
5 Claims. (Cl. 260—248)

ABSTRACT OF THE DISCLOSURE

The present invention provides a process for the manufacture of cyanuric acid of improved color which comprises first contacting for about 5 to about 60 minutes a 70 to 95% by weight aqueous urea synthesis solution which is at a temperature above 90° C. with a quantity of activated carbon which is from about 0.05% to about 1.0% by weight of urea in said solution. After such contacting the activated carbon is then removed from the aforesaid solution which is then pyrolyzed and calcined at a temperature in excess of 180° C. and at substantially atmospheric pressure to convert the urea contained in the solution to cyanuric acid.

---

The present invention relates to the preparation of cyanuric acid, and more particularly relates to novel and improved processes for the manufacture of pure cyanuric acids. The present invention further relates to a novel continuous process for the preparation of cyanuric acid which exhibits a highly improved color. The present invention also relates to urea purification and to the preparation of cyanuric acid therefrom.

In the past, cyanuric acid has been prepared by a varity of procedures, the more common of which is to merely melt and heat, e.g., pyrolyze, urea at atmospheric pressure above the temperature range in which it decomposes. Urea is produced commercially by the reaction of ammonia and carbon dioxide. After this synthesis, urea can then be calcined and/or pyrolyzed in order to convert it to the crude cyanuric acid. In this latter step, urea may be in a variety of forms including, for example, powdered urea, bulk urea, or an aqueous solution usually containing 70% or more by weight of urea. This latter step of pyrolysis and/or calcination of urea, to convert it to cyanuric acid, may be carried out by a process as described in U.S. Patent 2,943,088 issued June 28, 1960, to Richard Howard Westfall, or alternatively, the urea may be converted to urea cyanurate which is then heated to form cyanuric acid as described in U.S. Patent 3,154,545, issued Oct. 27, 1964, to William F. Symes and Steve Vazopolos. Cyanuric acid produced by either of such processes has a variety of uses. One of the uses of cyanuric acid is in the preparation of chlorinated cyanuric acids or their salts for use in swimming pool application wherein the (chlorinated) cyanuric acid is injected into the water for purification and/or disinfecting purposes. However, the cyanuric acid produced by almost any process and the chlorinated cyanuric acids prepared therefrom normally have a pale yellow to tan color which has been deemed objectionable from an esthetic point of view by personnel utilizing these compounds for swimming pool application. Furthermore, when dry purified cyanuric acid is used to make derivatives thereof, various processing problems have arisen which normally have required additional processing, i.e., purification, of such derivatives to produce an essentially colorless product or a product with a non-objectionable color. In accordance with the present invention it has unexpectedly been found possible to prepare essentially colorless (or white) cyanuric acid or cyanuric acid exhibiting an improved color which has, heretofore, not been obtainable in the prior art on a commercial scale.

It is one object of the present invention to provide novel processes for preparing purified cyanuric acid.

It is also an object of this invention to provide novel improved processes for producing purified cyanuric acid substantially free of color-producing bodies or impurities.

It is a further object of the present invention to provide an improved and novel process for preparing cyanuric acid from urea.

Additional objects and advantages of the present invention will become apparent from the following description and the appended claims.

In accordance with the processes of the present invention, it has been unexpectedly ascertained and discovered that if, after synthesis of carbon dioxide and ammonia to produce urea, an aqueous urea solution or melt above 90° C. and containing from about 50 to 99% by weight urea and preferably containing 70% to 99% by weight urea is passed through a bed of granular activated carbon prior to the step of pyrolysis and/or calcination to subsequently yield cyanuric acid, color-causing impurities or bodies are not present to any significant degree in the acid so produced. The most unusual aspect of this invention relates to the fact that, notwithstanding the step of pyrolysis and calcination which involve numerous operating variables and high temperatures which normally result in the formation of color producing bodies, the cyanuric acid produced therefrom will be essentially colorless or exhibit a greatly improved color (whiteness) due to the carbon treatment of the urea solution or melt. The prior art solution to urea purification and/or color improvement has been the crystallization and subsequent centrifuging of the urea particles to yield a purified urea product. However, this method is extremely expensive and time consuming. The novelty of this invention resides in the fact that, after carbon treatment of any urea synthesis solution and preferably those which are free of or do not contain any metal ions, the beneficial effects obtained therefrom are carried through the calcination and pyrolysis step to yield a cyanuric acid which is essentially colorless or has a greatly improved color.

As set forth in the introductory part of the present application, urea can be prepared by synthesis of ammonia and carbon dioxide. There are a variety of synthetic processes for producing urea, for example, solution recycle processes, oil slurry processes, hot gas recycle processes, and the Inventa process, all of which are described on pages 460 through 465 of the Encyclopedia of Chemical Technology, volume XIV, published by the Inter Science Encyclopedia, Incorporated of New York. The disclosure of these processes as set forth in this publication is considered as incorporated by reference in the present application. The urea as produced by these processes is usually in the form of a solution or melt containing 70% or more by weight of urea in order to facilitate better handling thereof. Such solution or melt is hereinafter referred to for convenience as the urea synthesis solution. Under the novel concept of the present invention, the urea synthesis solution is then passed through a carbon, preferably a granular activated carbon bed (if conducted on continuous basis or if batchwise, contacting the carbon with the urea solution and removing the carbon therefrom) to remove the color-causing impurities therefrom. The granular activated carbon, used in the subsequent examples set forth in the present application, was made from selected grades of bituminous coal combined with suitable binders to give superior hardness and long life. This carbon is produced under rigidly controlled conditions by high temperature steam activation and is the type supplied by Pittsburgh Activated Carbon Company under the name CAL type carbon. One of the critical physical properties of this activated carbon is its total surface area which is directly proportional to the absorption capacity. The total surface area of the CAL type carbon, which was found to be most successful in removing the color-causing impurities from the urea synthesis solution, is approximately 1000 to 1100 m.²/g. (square meters per gram) as determined by the nitrogen absorption method described by Brunauer, Emmett and Teller in the Journal of the American Chemical Society, volume 60, page 309 and published in 1938. Utilization of the activated carbon did not produce or result in any significant pH changes in the urea solution. While granular activated carbon as defined above was utilized in the subsequent examples herein, other types or forms of carbon which have absorption characteristics, i.e., carbon black, lampblack, bone black, etc., are within the scope of the present invention, and the particular method as described hereinafter of contacting the activated carbon with the urea synthesis solution is not considered a limiting factor of this invention. The variety of physical properties (some of which are deemed important and hereinafter described) of the different types of carbon used for contacting the urea would be considered in view of the processing factors and are all considered well within the scope of the present invention. Besides a fixed carbon bed, other means entail the utilization of a batch process whereby the urea solution is contained in a tank and the carbon is injected thereinto and the materials therein are subsequently agitated in order to promote effective contact between the urea synthesis solution and the (granular activated) carbon particles. The batchwise process and the continuous process are then both contemplated as being within the scope of the present invention.

It is theorized that one of the color-causing impurities is oil which has been injected into the urea due to the gas pressure pumps. Other impurities which may also contribute to producing objectionable colors are, for example, foaming material, residual acids, and biuret; of course, other impurities (either organic or inorganic) may be present. These impurities are removed by absorption due to the passage of the urea synthesis solution through the carbon bed, or merely contacting such solution with the carbon in a batchwise process. The treated urea synthesis if not sufficiently concentrated above 90%, is then passed into a concentrator wherein additional water is flashed-off by evaporation to yield a more (90 to 99%) concentrated urea synthesis solution or melt. The concentrated urea synthesis solution is then converted to cyanuric acid by processes known in the art, and preferably by one of the two processes described in the patent art hereinbefore referred to.

As previously mentioned and for exemplary purposes only, U.S. Patents 2,943,088 and 3,154,545 set forth two different processes for producing cyanuric acid using urea as a starting material. The disclosures of these patents are considered as incorporated by reference herein. In U.S. Patent 2,943,088, cyanuric acid is prepared by heating urea at a temperature of from about 240° C. to about 360° C. while continuously moving it so that it melts and deammoniates through a viscous plastic state into a hard solid state to form a crude reaction product in the form of small granules consisting largely of cyanuric acid, ammelide, ammeline, and minor quantities of other impurities. According to this patent, the reaction, for example, conversion to cyanuric acid by deammoniating urea through a viscous plastic state, can be carried out with urea alone while continuously tumbling the moving mass past a heat exchange surface at a speed of 50 to 1000 lineal inches per minute so that the urea deammoniates to form the above reaction product which breaks up into small free-flowing granules. The reaction can also be carried out by adding fresh urea with at least twice its weight and up to about six times its weight of the crude cyanuric acid granules, and feeding the mixture through a heated reaction zone during which the urea is deammoniated through a viscous plastic state to form the above mentioned crude reaction product of cyanuric acid, ammeline and other impurities.

According to U.S. Patent 3,154,545, the patentee prepares urea cyanurate in substantially pure form without an excess of urea and accompanying decomposition products thereof, and under substantially non-aqueous conditions. It is pointed out in this patent that urea cyanurate may be simply and economically prepared by contacting urea and cyanuric acid at a temperature in the range of from about 180° C. to about 320° C. and at substantially atmospheric pressure, the urea being contacted with hot cyanuric acid in an amount and at a range sufficient only for the urea to react with the cyanuric acid and to form urea cyanurate. The urea cyanurate so formed is then converted to cyanuric acid by heating the urea cyanurate in the range of from about 180° C. to about 320° C. to yield cyanuric acid which was usually free or substantially free of impurities, such as ammelide, ammeline, biuret, dicyandiamide, melamine, and the like. The ureau cyanurate may be prepared by contacting the urea with cyanuric acid in an amount and at a rate such that an excess of urea is never present or in contact with the cyanuric acid and thus does not deammoniate through a viscous plastic state. The ureau may be contacted with the hot cyanuric acid in solid form, for example, as a powdered dust or in a liquid form, for example, as molten urea, or a concentrated aqueous solution or slurry containing more than 70% by weight of urea. When the urea is contacted with the cyanuric acid in liquid form it may be contacted as a continuous stream or in the form of finely divided droplets.

The crude cyanuric acid produced by the process set forth in U.S. Patent 2,943,088 is stated to contain 70 to 75% cyanuric acid and 20 to 25% impurities and/or side products such as ammeline, ammelide, etc. The crude cyanuric acid may be hydrolyzed by contacting it with a 10–30% sulphuric acid solution at a temperature range of from about 90 to 120° C. This latter step is usually referred to as the purification of crude cyanuric acid and the end product contains a material of about 98% or higher by weight cyanuric acid. Such cyanuric acid is then either packaged as a dry product and sold as such, or it can be used to produce further derivatives of cyanuric acid.

As set forth above, the novel concept of this invention relates to the fact that carbon treatment of a crude urea synthesis solution will subsequently yield a cyanuric acid which exhibits a greatly improved color notwithstanding the processing steps therebetween. Specifically, the improved cyanuric acid exhibits a "whiteness" which is important for obtaining satisfactory consumer acceptance. While oil was previously mentioned as one of the possible color-causing impurities, the chemistry involved and the exact color-causing impurities are not known, and it is not desired to have the present invention limited thereto. It is also within the realm of theory that the combination of carbon-treatment and heating, i.e., pyrolysis and calcination or intermediate conversion to urea cyanurate, may have an accumulative effect.

A further understanding of the novel process of the present invention will be obtained from the following specific examples which are intended to illustrate the invention but which are not intended to limit the scope thereof.

EXAMPLE I

*Batchwise urea purification*

As stated hereinbefore, one of the color-causing impurities in the urea solution may be oil which comes largely from the compressors and pumps in the ammonia and carbon dioxide transfer systems. The urea solution produced by the reaction of ammonia and carbon dioxide usually contains from about 50 to 150 parts per million of oil. When this crude urea solution was pyrolyzed (heated in a manner similar to U.S. 3,154,545), the cyanuric acid obtained therefrom was light tan to yellow in color as compared to pure white cyanuric acid obtained from analytical type crystal urea alone. The ethylene oxide reaction product (hereinafter defined) with the hydrolyzed cyanuric acid which originated from oil treated urea gave APHA colors (American Public Health Association Standard liquid solution colors) of 250 to 300 as compared to colors of 100 or less of the analytical type crystal urea. It was apparent that oil in urea is a significant factor in the color of resultant end product cyanuric acid. However, oil does not appear to be the only color contributing impurity in cyanuric acid produced by the aforementioned methods. Several urea solution samples, containing as little as 15–20 parts per million of oil by analysis, subsequently produced a cyanuric acid, as measured by the ethylene oxide reaction product having colors of 200–300 APHA and greater. It was ascertained that the oil level in the urea solution could not be reduced economically by improved operations because of the conventional pumping problems, e.g., shaft seal leakage, etc. Replacing the oil with one which would not cause a color problem did not appear feasible. Furthermore and as set forth above, oil did not necessarily appear to be the only culprit.

The light tan to yellow color of the cyanuric acid is mainly due to the presence of a very dark brown almost black material that is insoluble in acid or alkali solutions. The addition of this color body to pure white cyanuric acid at a 0.1% level and subsequent ethoxylation produced an increase in end product color from 40 to 200 APHA. The concentration of the color body in most samples of crude cyanuric acid was 0.1% or less. Analysis of samples of this color body material showed 10 to 20% metal (including iron, silica, magnesium, etc.), 16% carbon, 3% hydrogen, and 11% nitrogen. No valid conclusion regarding this color-causing material could be made from the standard infrared analyses thereof.

As set forth in the earlier part of this specification, it was unexpectedly discovered that the utilization of activated carbon to treat the crude urea solution prior to pyrolysis would yield a greatly improved cyanuric acid characterized by a "whiteness" in color as compared to the light tan to yellow color produced by the non-treatment of the urea solution. In order to determine the feasibility of the method for impurity removal, two series ((A) and (B)) of experiments were set up and are discussed as follows.

(A) The first series determined the carbon dosage necessary, i.e., the quantity required, to effect the oil and/or other impurity removal; the second series or experiment determined the effective urea-carbon contact time. A 50-gram sample of granular activated carbon was ball-milled to yield a material which was characterized in that 100% of said material passed through a 325 mesh screen—U.S. Standard; this material was the type carbon used throughout both series. The series were run according to the subsequent description. A concentrated, i.e., 82% urea solution containing 122 grams was prepared utilizing 100 grams of industrial grade urea and 22 cc. of water, and then heated to 95° C. in a 250 milliliter flask. The calculated amount of carbon necessary, based on 100 grams of anhydrous urea, to give the required dosage (i.e., 0.05%–0.05 gram; 0.1%–0.1 gram, etc.) was added. The temperature was maintained at 95 to 100° C. and the flask swirled manually for 10 minutes. At the end of 10 minutes, the contents of the flask were filtered (hot) through a steam heated Buchner funnel using a No. 1 whatman filter paper. The solution was concentrated by flashing-off the water under vacuum. The molten urea was then transferred to a porcelain evaporating dish and pyrolyzed at 240–250° C. for approximately 2½ hours. After pyrolysis, the crude cyanuric acid was milled and, using a Photovolt meter equipped with a tri-stimulus green filter, the reflectance measured, using a standard magnesium oxide plate with reflectance equal to 83.5 as the reference point.

(B) The second series differed from the above procedure in that the carbon dosage was held constant (0.1%) and the contact time varied from 10 minutes to 4 hours. The data collected in these two series are shown in Tables 1 and 2.

TABLE 1.—EFFECT OF CARBON DOSAGE ON COLOR OF CRUDE CYANURIC ACID

Temperature of urea solution (82%)—95–100° C.
Contact time—10 minutes.

| Reflectance of crude cyanuric acid: | Percent carbon by weight of anhydrous urea |
|---|---|
| 85.4 | 0 |
| 89.8 | .05 |
| 89.6 | .10 |
| 92.0 | .50 |
| 93.0 | 1.00 |
| 92.8 | 2.50 |
| 93.0 | 5.00 |

Reflectance of cyanuric acid prepared from crystal urea purified by crystallization: 92.8.

TABLE 2.—EFFECT OF CONTACT TIME ON COLOR OF CRUDE CYANURIC ACID

Temperature of urea solution (82%)—95–100° C.
Carbon dosage (based on anhydrous urea)—0.1%.

| Reflectance of crude cyanuric acid: | Contact time, minutes |
|---|---|
| 85.4 | 0 |
| 89.5 | 10 |
| 92.5 | 60 |
| 93.0 | 120 |
| 93.0 | 240 |

Reflectance of cyanuric acid prepared from crystal urea purified by crystallization: 92.8.

EXAMPLE II

*Color measurement*

It was discovered that the color (reflectance) of samples of cyanuric acid per se from various sources could not be correlated accurately with the APHA color of the cyanuric acid-ethylene oxide derivative. This is partially due to the fact that the reflectance test is affected by surface characteristics of the cyanuric acid other than the presence of actual yellow or tan color bodies. The crystals of cyanuric acid are in some cases opaque, as when dried rapidly in an air current. If dried slowly as a cake of material, translucent or transparent crystals are obtained by the slow transition from dihydrate to the anhydrous crystal. The clear crystals give a low reflectance and appear more off-colored to the eyes, i.e., by visual observation. An example of this facet in which cyanuric acid was dried under two conditions to give a marked difference in appearance but yield the same color for the ethylene oxide derivative is as follows. Under a drying condition of an open watch glass, the cyanuric acid reflectance color was 80.5 and the ethylene oxide derivative of the same cyanuric acid gave an APHA color of 250. Under the drying condition of a covered watch glass, the cyanuric acid reflectance color was 71.5 but this still yielded an ethylene oxide derivative APHA color of 250.

From the aforementioned discussion it was ascertained that the more accurate or better method of determining color would be by measuring the end product solution of the reaction of cyanuric acid with ethylene oxide in a dimethyl formamide solution. This method of measuring color is merely exemplary. Measuring the color of other derivatives of the cyanuric acid can be utilized as the standard for color comparison. The crude cyanuric acid samples prepared in the two series ((A) and (B)) were hydrolyzed (batchwise) with an aqueous sulfuric acid solution having a concentration between 15 to 22% $H_2SO_4$. After hydrolysis, the ethylene oxide derivative of cyanuric acid [tris-(2-hydroxy-ethyl)isocyanurate] was prepared as subsequently described.

The reaction (cyanuric acid+ethylene oxide in dimethyl formamide) system consisted of a one-liter, three-neck (ground glass ball and socket) flask fitted with a stirrer, reflux condenser, and a gas inlet connection supporting a thermometer, and a heating mantle. The stirrer was a single flattened paddle that splashed the liquid reaction mass vigorously in order to produce a good vapor-liquid contact. The system was set up in order to allow purging of the vapor area therein with nitrogen prior to the reaction of cyanuric acid with ethylene oxide. The over-all operation was carried out at under 20 centimeters or more pressure as measured by a standard manometer. The flask was charged with 25 grams of the cyanuric acid, prepared as described in the above mentioned series, and 285 milliliters of dimethyl formamide, while swirling, in order to prevent formation of a hard cake since it is known that cyanuric acid reacts with the solvent. Two grams of sodium hydroxide pellets were added to the flask as a catalyst. The apparatus was then assembled and the clamp tightened in order to give a good pressure seal. The system was then purged with nitrogen ten times by alternately raising the pressure to 20 centimeters with nitrogen and then reducing it to zero through a bleed valve. While continuously stirring the reaction mass, the temperature was then raised to 125–130° C. The stirring was then stopped and the system purged twice with ethylene oxide by raising the pressure to 20 centimeters and then reducing it to atmospheric pressure by bleeding to the air. The pressure was again raised to 20 centimeters and the ethylene oxide cylinder weight was then recorded. The reaction mass was then stirred vigorously while ethylene oxide was introduced at the required rate to hold the pressure therein at about 20 centimeters. The temperature of the reaction mass was maintained at 130–135° C. by adjustment of the heating mantle variac, and the over-all reaction continued therein until 26 to 27 grams of ethylene oxide had been absorbed by the mass. The flask was then purged ten times with nitrogen, and the flask and the contents thereof were then cooled to about 60° C. or slightly less with a water bath. The purging procedure was again repeated, with nitrogen, and the flask then cooled to room temperature, i.e., about 25° C. The contents of the flask were then filtered, using a whatman No. 3 filter paper, to remove residual sodium cyanurate, sodium hydroxide, ammeline and ammelide which would interfere with producing a reliable APHA color. The color of the clear solution produced therefrom was then determined by comparison with the APHA standards. Pure cyanuric acid (as produced by the carbon treatment method of this invention), when reacted with the ethylene oxide in a dimethyl formamide solution, produced a dimethyl formamide solution of the derivative of cyanuric acid which was characterized by having an APHA color of 75 to 120 which is a highly acceptable color by consumer standards. The dimethyl formamide solution of the derivative of cyanuric acid produced from non-carbon treated urea yields an APHA color of 250–500.

The two aforementioned series and the subsequent reaction of the cyanuric acid with the ethylene oxide in a dimethyl foramide solution established that the carbon requiresments are from about .05% to about 1.0%, with the preferred dosage about 0.1%, by weight of the total weight of anhydrous urea treated and that approximately from about a 5- to about a 60-minute, preferably a 10-minute, contact time (batchwise) would be sufficient to subsequently yield a purified cyanuric acid product which would be characterized by a highly improved color which would readily be acceptable to the consumer.

After the aforementioned series were completed, a three- pound sample of pure (i.e., substantially free from ammelide, ammeline, etc.) cyanuric acid was prepared from a composite of crude cyanuric acid made from two batches of carbon treated urea, one at a 0.05% carbon dosage level and the other at a 0.1% carbon dosage level. This sample yielded a dimethyl formamide solution of the derivative of cyanuric acid with an APHA color of 100. While 0.1% carbon dosage was the level at which the aforementioned experiments were conducted, a carbon dosage in the range of from about 0.05% to about 2.0% and greater is certainly within the scope of the present invention.

EXAMPLE III

*Continuous urea purification*

While the aforementioned experiments were conducted in a batchwise process, it is also within the scope of this present invention to continuously treat a urea solution to remove any color-causing impurities therefrom. Specifically along these lines, another experiment was run wherein a small column, 0.5 inch in diameter by 18 inches high and containing CAL type (12 by 40 mesh) granular activated carbon produced by Pittsburgh Activated Carbon Company, was erected. The granular activated carbon inside the small column rested on a glass wool plug and the carbon bed was approximately 9 to 10 inches in height. A urea solution, made from prilled (commercial urea containing approximately 20 parts per million oil that produced an off-colored cyanuric acid, was then fed by gravity down through the activated carbon bed at a rate that provided a slight level of solution over the top of the bed, i.e., the rate was in the range of from about 1 to about 2 gal./min./ft.$^2$ of cross-sectional area of the carbon bed. The urea-carbon contact time in this experiment was of the order of 10–15 seconds. The indicated carbon requirements were about 0.2% by weight based on 100% anhydrous urea. The purified cyanuric acid, which was produced by the pyrolysis and calcination (similar to the process disclosed in U.S. 3,154,545) of the carbon treated urea solution, yielded a reflectance color of approximately 80–89 and the ethylene oxide reaction product, i.e., dimethyl formamide solution of the derivative of cyanuric acid, of this purified cyanuric acid gave an APHA color of approximately 100 to 125. In view of the fact that the urea solution used in this experiment contained only 20 parts per million oil therein, it is theorized that other color-causing impurities, e.g., organic compounds, also contribute to the "off-color" of the cyanuric acid after pyrolysis of the urea solution. This particular facet of the invention has been mentioned in the earlier parts of this specification but is now more clearly and more vividly pointed out by this experiment.

As previously set forth in the earlier part of the specification, the novel concept herein lies in the fact that the carbon treatment of the urea solution and the subsequent pyrolysis and calcination thereof, will yield a cyanuric acid and derivatives thereof which exhibit a greatly improved color which is highly acceptable for consumer use. While the discussion of cyanuric acid derivatives herein was confined to the reaction product with ethylene oxide in a dimethyl formamide solution, the color of other organic and inorganic derivatives of cyanuric acid is also improved by practicing the present invention wherein urea is used as the basic starting material and has been treated with activated carbon.

While other processing variables (pH, impurities from containers and other vessels, drying conditions—notably temperature and retention time therein, etc.) may contribute to the production of an off-colored cyanuric acid, it was unexpectedy ascertained and verified by experimentation that the quality of the urea (improved by carbon treatment) was the most important processing variable to be controlled in order to produce an acceptable cyanuric acid color. The carbon treatment of the urea solution consequently yields unexpected and novel results which are completely undisclosed, either directly or indirectly, by the prior art.

What is claimed is:

1. A process for the manufacture of cyanuric acid of improved color which comprises contacting for about 5 to about 60 minutes a 70 to 99% by weight aqueous urea synthesis solution which is at a temperature above 90° C. with a quantity of activated carbon which is from about .05% to about 1.0% by weight of the weight of urea in said solution; removing the activated carbon from said solution; pyrolyzing and calcinating said solution at a temperature in excess of 180° C. and at substantially atmospheric pressure whereby the urea is converted to cyanuric acid.

2. The process as set forth in claim 1 wherein the carbon is granular and has a total surface area of from about 1000 to about 1100 square meters per gram.

3. A continuous process for the manufacture of cyanuric acid of improved color which comprises passing an aqueous urea synthesis solution at a temperature about 90° C. and containing from about 70% to about 90% by weight urea through a bed of carbon whereby any color-causing impurities in said solution are removed therefrom; concentrating the purified urea synthesis solution to a concentration of from about 90 to about 99% by weight of urea; and contacting the concentrated urea solution with cyanuric acid at a temperature in the range of from about 180° C. to about 320° C. and at substantially atmospheric pressure whereby the urea is converted only to urea cyanurate which is then converted to cyanuric acid by the continued heating at a temperature in excess of 180° C.

4. The process as set forth in claim 3 wherein the carbon is granular activated carbon and the quantity of carbon used for the bed is approximately 0.2 gram per 100 grams of anhydrous urea passing therethrough.

5. The process as set forth in claim 3 wherein the rate of passing the urea solution through the carbon bed was from about 1 to about 2 gallons per minute per square foot of the cross-sectional area of said carbon bed.

References Cited

UNITED STATES PATENTS

| 2,744,938 | 5/1956 | Urban | 260—708 XR |
| 2,943,088 | 6/1960 | Westfall | 260—248 |
| 3,046,138 | 7/1962 | Eck | 260—708 |

FOREIGN PATENTS

| 860,487 | 12/1952 | Germany. |

OTHER REFERENCES

Wittenberger: Chemical Abstracts, vol. 46 (1952), col. 4700(i).

WALTER A. MODANCE, *Primary Examiner.*

JOHN D. RANDOLPH, *Examiner.*

JOHN M. FORD, *Assistant Examiner.*